R. N. MURPHY.
SANITARY TRAP.
APPLICATION FILED MAR. 26, 1917. RENEWED APR. 16, 1918.
1,268,379.
Patented June 4, 1918.
2 SHEETS—SHEET 1.
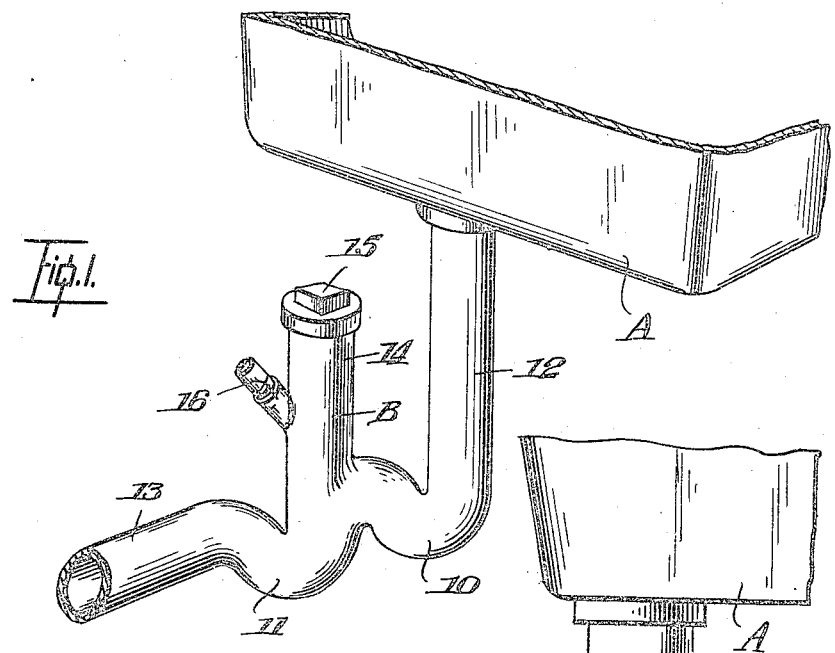
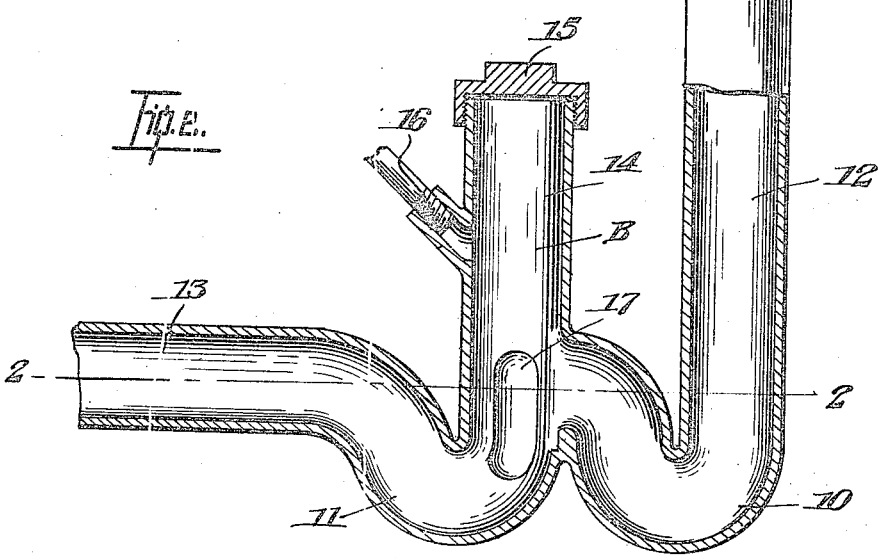

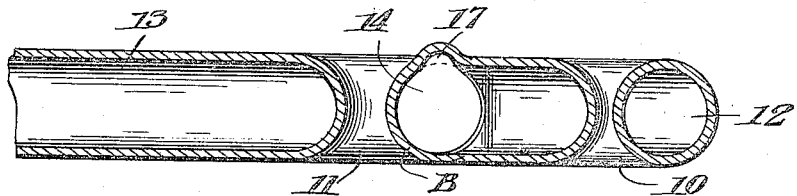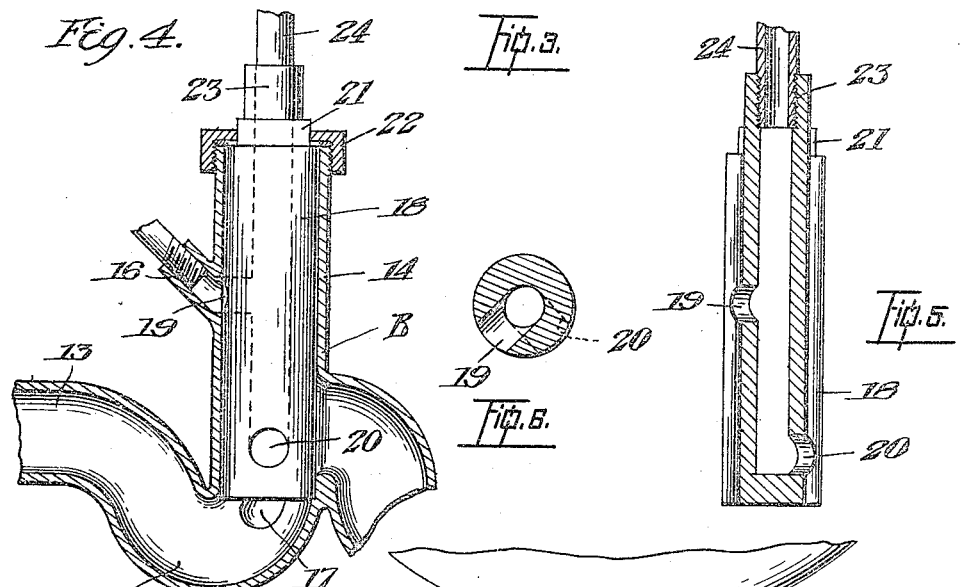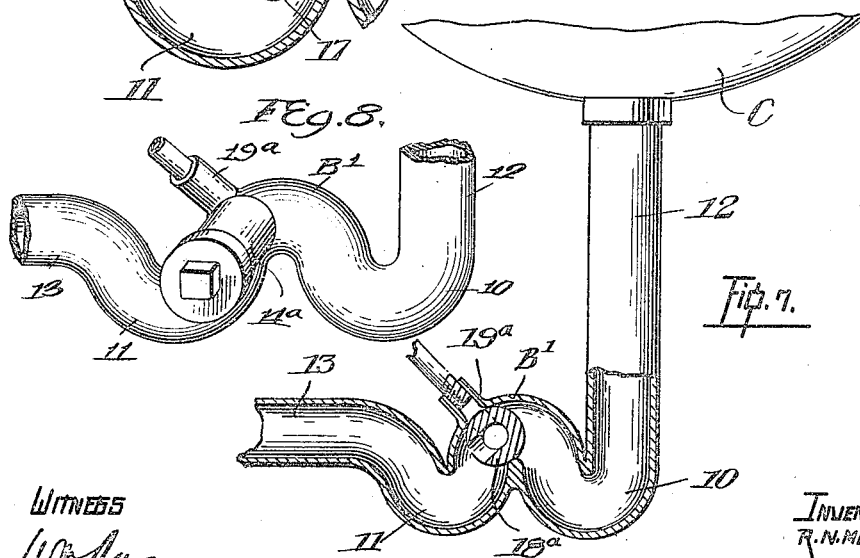

UNITED STATES PATENT OFFICE.

ROBERT NICHOLAS MURPHY, OF OTTAWA, ONTARIO, CANADA.

SANITARY TRAP.

1,268,379.  Specification of Letters Patent.  Patented June 4, 1918.

Application filed March 26, 1917, Serial No. 157,536. Renewed April 16, 1918. Serial No. 228,970.

*To all whom it may concern:*

Be it known that I, ROBERT NICHOLAS MURPHY, a subject of the King of Great Britain, and residing at 411 Lisgar street, in the city of Ottawa, Province of Ontario, Dominion of Canada, have invented certain new and useful Improvements in Sanitary Traps, and do hereby declare that the following is a full, clear, and exact description of the invention, such as will enable those skilled in the art to which it appertains to make and use the same.

This invention relates to improvements in sanitary traps. It is common practice in sanitary engineering to utilize traps containing only one water seal, and since siphoning of this seal is extremely liable to take place, it frequently results that the household forms a ventilating system for the sewer, the consequence often detrimental to the occupants of the house.

Moreover, it is well known in engineering practice that sewer gases are taken up by the water forming the seals and the gases are then passed on to the atmosphere of the house, and when there is no main or intercepting trap installed, the health of the occupants suffer.

In the present invention, these objections are overcome and a pair of water seals are provided in the trap and arranged in such a manner that should sewer gases be taken up by one of the seals they will be passed to the atmosphere and cannot under any circumstances gain access to the house in which such trap is installed.

Further objects are to permit of the several parts of the trap being flushed from the water main so that should any blocking of the trap take place it may be readily removed without undue inconvenience.

Further objects still are to permit of the usual smoke and gas tests being readily made on the trap by utilizing the flushing mechanism.

Further objects still are to render the bore of the trap of uniform cross section throughout and continuous so that the velocity of flow of water passing through the trap is utilized to keep the same clear.

With the above and other objects in view the invention consists essentially of the improved construction particularly described and set forth in the following specification and accompanying drawings forming part of the same.

In the drawings,

Figure 1 is a perspective view of the improved trap as seen when attached to a bath.

Fig. 2 is a longitudinal section of the same.

Fig. 3 is a transverse section on the line 2—2 of Fig. 2.

Fig. 4 is a fragmentary longitudinal section of the trap showing the flushing plug or cock therein.

Fig. 5 is a sectional elevation of the flushing plug or cock.

Fig. 6 is a transverse section of the flushing plug or cock.

Fig. 7 is a longitudinal section of the improved trap as seen when attached to a basin, in this case the flushing plug or cock being horizontally disposed for the sake of clearance.

Fig. 8 is a fragmentary perspective view of that form of the trap illustrated in Fig. 7 and showing the chamber with which the cleaning plug engages.

Like characters of reference refer to like parts in the several figures.

Referring to the drawings, A represents a bath with the improved trap B operatively connected thereto.

This trap consists of a pair of water seals 10 and 11 operatively connected in alinement, the seals being of substantially uniform cross section throughout, and arranged so that their bores are continuous. The inlet end 12 of the trap is vertically disposed and connected to the bath A in any suitable manner usually practised in sanitary engineering, while in the embodiment illustrated the discharge end 13 of the trap is horizontally disposed and arranged at a substantially lower level than the inlet end.

Intermediate of the seals 10 and 11, a chamber 14 is provided having a threaded upper end with which the cap or cover 15 makes threaded engagement, while intermediate of the height of the chamber an angularly disposed and upwardly extending air vent 16 is located.

The inner wall of the chamber 14 and at the lower end thereof is provided with a recessed portion 17 which extends into the seal 11 for an object which will be made clear hereafter.

To facilitate flushing the trap, I provide a removable plug or cock 18 adapted to rotatably engage with the inner wall of the chamber 14, the said plug being formed hollow and provided with outlets 19 and 20 located intermediate of the length and at the lower end thereof and arranged at substantially right angles to each other.

The upper end of the plug 18 is reduced as shown at 21 to engage with the packing gland 22 which makes threaded engagement with the upper end of the chamber 14, the inner wall of the plug being threaded at the upper end 23 to engage with the pipe 24 designed to be connected to the water main.

In that type of the invention illustrated in Fig. 7, the water seals 10 and 11 are arranged in alinement with their bores continuous and of uniform cross section, but in this case owing to the fact that there is not sufficient clearance between the basin C and the trap B' to permit of the flushing cock or plug being inserted for flushing purposes, the chamber 14$^a$ is horizontally disposed; but is otherwise the facsimile of that already described with reference to the other figures of the drawings.

The chamber 14$^a$ is also provided with an angularly disposed vent 19$^a$, but the recessed portion shown at 17 in Figs. 2 and 4 is dispensed with, as it is quite unnecessary to this type of a trap.

The plug 18$^a$ in this case engages the chamber 14$^a$ in the manner above described; and it is thought unnecessary to further enlarge upon or illustrate the same, as it would only be unnecessary padding to the description.

When the trap is in use, the water from the bath A passes through the inlet port on 12 and is delivered to the seal 10 from which it passes through the seal 11 to the discharge 13.

It should be particularly noted that the upper wall of the trap which connects the two seals 10 and 11 is curvilinear, so that the desired direction of flow is given to the water, and the water is driven through the seal 11 under the velocity of the inflow from the bath A to the inlet 12.

It will thus be clear that the flushing of the seal 11 does not depend on the water head in the chamber 14, and by using the velocity of flow of the water in this manner, a thorough scouring or cleaning of the water seals 10 and 11 takes place, and there is little or no liability of sediment collecting therein.

Should by any chance a blockage take place in the trap it is only necessary to remove the cap or cover 15 and insert the flushing plug or cock 18, in the chamber 14, whereupon the packing gland 22 is positioned and the plug or cock connected through the pipe 24 with the watermain.

The plug 18 is now rotated until the discharge end 20 registers with the seal 10 and when the water from the main is turned on the said water seal and inlet 12 will be flushed and thoroughly cleaned.

The plug 18 is now rotated until the discharge 20 registers with the recess 17, in which position the water seal 10 and air vent 16 are cut off, and when the water from the main is turned on the water passes from the discharge 20 through the recess portion 17 into the seal 11, where the pressure of the water removes any blockage in the seal 11 and discharge 13.

The plug 18 is now rotated until the discharge 19 registers with the air vent 16 and on the water from the main being turned on the said vent is thoroughly flushed and cleaned. The plug 18 is now removed and the cap or cover 15 replaced on the chamber 14 when the trap is in condition for use.

It will be readily apparent that the plug 18 may be readily utilized to apply the smoke test to the trap by inserting it in the chamber 14 in the manner above described and connecting the pipe 24 to the smoke apparatus.

By arranging the discharge orifices 19 and 20 at right angles to each other in the plug or cock 18, it will be clear that when one of the said discharge orifices registers with its coacting portion of the trap the other orifice is cut off, so that the water pressure from the main is applied to each portion of the trap individually and in turn.

In that type of the invention illustrated in Fig. 7, the connection between the seals 10 and 11 consists of a curvilinear or semi-circular upper wall which gives the desired direction of flow to the water passing through the trap.

The trap may in this case be also cleaned through the medium of the plug 18$^a$ inserted in the chamber 14$^a$ and having water pressure applied thereto from the main in the manner above described.

It is thought unnecessary to re-describe this operation in connection with Fig. 7.

It will be readily understood that in manufacturing this trap that the bore will be as smooth as possible and the corners well defined, so that there is no liability of sediment lodging thereon, and tending to stop or block the trap.

Since the seals 10 and 11 are semicircular and arranged in alinement with an intermediate chamber 14 between, which communicates with the atmosphere through the vent 16, it will be readily seen that should the water in the seal 11 siphon it is quite impossible for the water in the seal 10 to be siphoned.

Should the pressure of the gas in the sewer with which the discharge 13 connects rise above that of the atmosphere then the water in the seal 11 would be forced into the seal 10 and the excess of sewer gas would escape through the vent 16, reducing the pressure in the sewer so that the water in the seal 10 which would be under a slight head would return and fill seal 11.

By angularly disposing the vents 16 it will be seen that should any solid matter enter the same even from the exterior of the trap it will gravitate into the seal 11 and will not lodge in the said vent and tend to plug the same, so that the vent is at all times in free communication with the atmosphere.

In the embodiment illustrated this trap is shown connected to a bath or basin, but it will be readily understood that it may be used as an intercepting trap on closets, sinks and all types of household and sanitary fixtures.

As many changes could be made in the above construction, and many apparently widely different embodiments of my invention, within the scope of the claims, constructed without departing from the spirit or scope thereof, it is intended that all matter contained in the accompanying specification and drawing shall be interpreted as illustrative and not in a limiting sense.

What I claim as my invention is:

1. A trap of the class described comprising a pair of water seals arranged in alinement with a continuous bore of uniform cross section throughout, a clean flush out chamber intermediate of the two water seals provided with a recess extending from below to above the normal water level therein and an angularly disposed vent operatively connected to the chamber.

2. A trap of the class described comprising a pair of water seals arranged in alinement with a continuous bore of uniform cross section throughout, an air vent operatively connected to the trap and means for flushing each of the water seals and the air vent individually from the water main.

3. A trap of the class described comprising a pair of water seals arranged in alinement with a continuous bore of uniform cross section throughout, an air vent operatively connected to the trap and a hollow removable plug adapted to be inserted into the trap and permit of the water seal and air vent being individually flushed from the water main.

4. A trap of the class described comprising a pair of water seals arranged in alinement with a continuous bore of uniform cross section throughout, a chamber intermediate of the water seal, a plug adapted to engage with the chamber provided with a pair of discharged orifices arranged at right angles to each other, and an air vent operatively connected to the chamber.

5. A trap of the class described comprising a pair of water seals arranged in alinement with a continuous bore of uniform cross section throughout, a chamber intermediate of the water seals having a recess in the lower end thereof, a plug designed to rotatably engage with the chamber, a vent on the chamber intermediate of the length thereof, and means for connecting the plug to a water main.

In witness whereof I have hereunto set my hand.

ROBERT NICHOLAS MURPHY.

Copies of this patent may be obtained for five cents each, by addressing the "Commissioner of Patents, Washington, D. C."